US010427882B2

(12) United States Patent
Gill et al.

(10) Patent No.: US 10,427,882 B2
(45) Date of Patent: Oct. 1, 2019

(54) CONVEYOR BELT SUPPORT SYSTEM (71) Applicant: John Bean Technologies Corporation, Chicago, IL (US)

(72) Inventors: Harrison T. Gill, Redmond, WA (US); Erick A. Sorenson, Shoreline, WA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 15/824,938

(22) Filed: Nov. 28, 2017

(65) Prior Publication Data

US 2019/0161280 A1     May 30, 2019

(51) Int. Cl.
| | |
|---|---|
| B65G 17/48 | (2006.01) |
| B65G 17/06 | (2006.01) |
| B65G 43/00 | (2006.01) |
| B26F 3/00 | (2006.01) |
| B26D 5/00 | (2006.01) |
| B26D 5/32 | (2006.01) |

(Continued)

(52) U.S. Cl.
CPC .............. *B65G 17/48* (2013.01); *B26D 5/007* (2013.01); *B26D 5/30* (2013.01); *B26D 5/32* (2013.01); *B26F 3/004* (2013.01); *B65G 15/62* (2013.01); *B65G 17/064* (2013.01); *B65G 43/00* (2013.01); *B65G 2201/0202* (2013.01); *B65G 2203/0283* (2013.01); *B65G 2203/041* (2013.01)

(58) Field of Classification Search
CPC ....................................................... B65G 17/48
See application file for complete search history.

(56) References Cited

U.S. PATENT DOCUMENTS 4,875,254 A    10/1989   Rudy et al.
5,365,186 A    11/1994   Ensely
(Continued)

FOREIGN PATENT DOCUMENTS

DK         176873 B1    5/2004
EP    3 081 090 A1   10/2016
(Continued)

OTHER PUBLICATIONS

International Search Report and Written Opinion dated Mar. 6, 2019, issued in corresponding International Application No. PCT/US2018/062543, filed Nov. 27, 2018, 15 pages.

*Primary Examiner* — Gene O Crawford
*Assistant Examiner* — Lester Rushin, III
(74) *Attorney, Agent, or Firm* — Christensen O'Connor Johnson Kindness PLLC (57) ABSTRACT

A conveyor belt support system for a conveyor having a belt movable along a frame includes a plurality of support slats each extending substantially along a longitudinal axis of the belt. The plurality of support slats is adjustable in position relative to the belt.
A processing machine for scanning and portioning a workpiece includes a scanning station configured to scan a workpiece to ascertain at least one physical parameter of the workpiece, a portioning station configured to portion the scanned workpiece, a conveyor for moving the workpiece beneath the scanning station and the portioning station that includes a belt with an open form moveable along a frame, and the conveyor belt support system located beneath at least the scanning station.

20 Claims, 9 Drawing Sheets

(51) Int. Cl.
*B26D 5/30* (2006.01)
*B65G 15/62* (2006.01)

(56) References Cited

U.S. PATENT DOCUMENTS

| | | |
|---|---|---|
| 5,585,605 A | 12/1996 | Williams et al. |
| 5,762,178 A | 6/1998 | Tarlton |
| 5,868,056 A | 2/1999 | Pfarr et al. |
| 6,427,831 B1 | 8/2002 | Norton |
| 9,128,810 B1 * | 9/2015 | Blaine .................. A22C 17/002 |
| 2009/0008225 A1 | 1/2009 | Call et al. |

FOREIGN PATENT DOCUMENTS

| | | | |
|---|---|---|---|
| JP | 58-191923 U | 12/1983 | |
| WO | WO-2009109704 A2 * | 9/2009 | ............. B23D 45/22 |

* cited by examiner

CONVEYOR BELT SUPPORT SYSTEM

BACKGROUND

Workpieces, including food products, are portioned or otherwise cut into smaller pieces by processors in accordance with customer needs. Also, excess fat, bones, and other foreign or undesired materials are routinely trimmed from food products. It is usually highly desirable to portion and/or trim the food products into uniform sizes, for example, for steaks to be served at restaurants or chicken fillets used in frozen dinners or in chicken burgers.

Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on an conveyor belt and a determination is made through the use of a computer as to how best to portion the chicken breast to the weights desired by the customer, with no or limited amount of fat, so as to use the chicken breast most effectively.

Portioning and/or trimming of the workpiece can be carried out by various cutting devices, including high-speed liquid jet cutters (liquids may include, for example, water or liquid nitrogen). In many high-speed portioning systems, several high-speed waterjet cutters are positioned along the length of a conveyor to achieve high throughput of the portioned/cut workpieces. Once the portioning/trimming has occurred, the resulting portions are off-loaded from the cutting conveyor and placed on a take-away conveyor for further processing or, perhaps, to be placed in a storage bin.

As noted above, prior to reaching the cutting devices, the workpiece may be scanned at a scanning station to ascertain physical parameters pertaining to size and/or shape of the workpiece. The scanning station may include an optical scanner, an X-ray scanner, or any other suitable scanning system suitable for ascertaining the physical parameters pertaining to size and/or shape of the workpiece.

Figure 1:
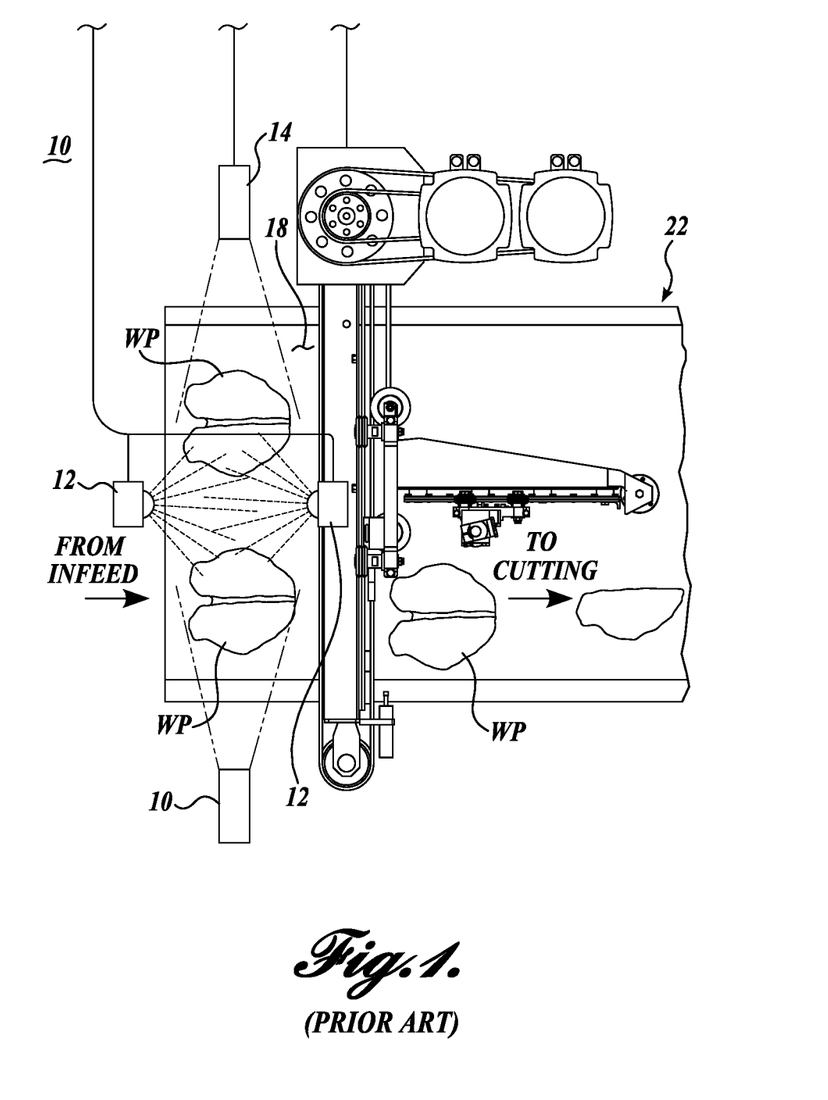
FIG. 1 is a schematic view of a prior art scanning station.
Figure 2A:
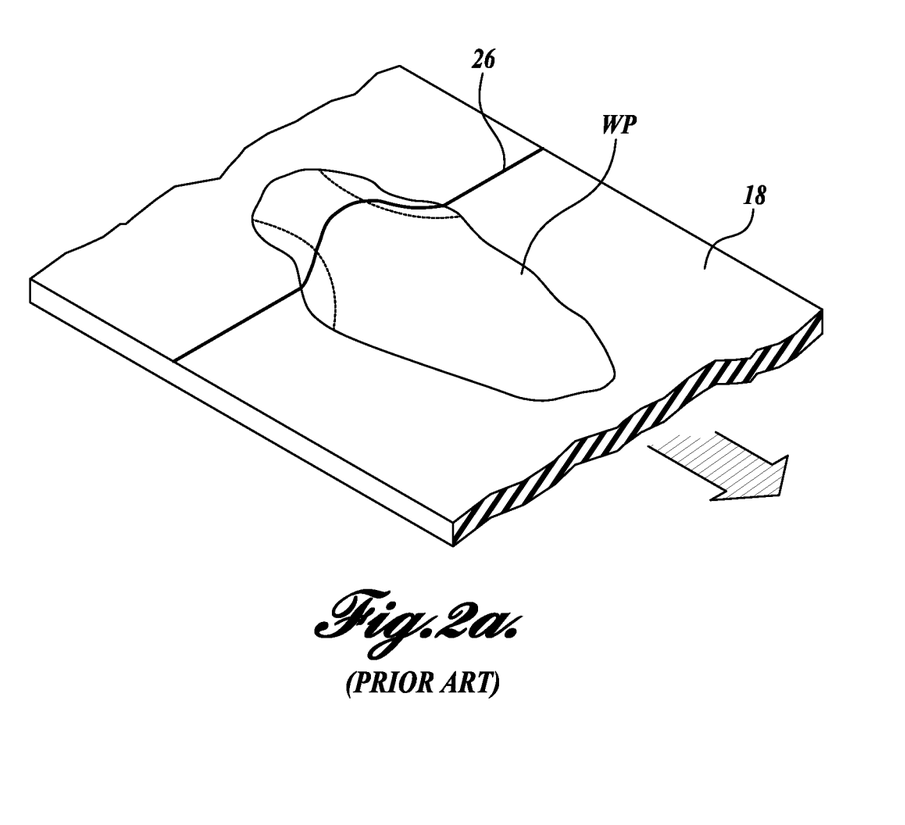
FIG. 2a is an exemplary isometric view of a light stripe or laser line applied to a workpiece conveyed on a prior art conveyor belt during scanning with the scanning station shown in FIG. 1.

In an exemplary prior art scanning station shown in FIG. 1, a conveyor carries a workpiece WP beneath a scanning system 10. The scanning system may be of a variety of different types, including video cameras 12 to view the workpiece WP illuminated by one or more light sources. Light from a light source 14 is extended transversely across a moving conveyor belt 18 of a conveying system 22 to define a sharp shadow or light stripe line 26, as shown in FIG. 2, with the area forwardly of the transverse beam being dark. When no workpiece WP is being carried by the conveyor belt 18, the shadow line/light stripe 26 extends across the belt, only being distorted by the belt. However, when the workpiece WP passes across the shadow line/light stripe, the upper, irregular surface of the workpiece produces an irregular shadow line/light stripe as viewed by video cameras 12 angled downwardly on the workpiece and the shadow line/light stripe. The video cameras 12 detect the displacement of the shadow line/light stripe 26 (i.e., in the z-axis direction) from the position it would occupy if no workpiece were present on the conveyor belt 18 (i.e., from an initial z-axis location), and send appropriate output signals to one or more computers, computing devices, etc., having at least one processor (not shown). This displacement represents the thickness of the workpiece along the shadow line/light stripe. The length of the workpiece is determined by the distance of the belt travel that shadow line/light stripes are created by the workpiece. In this regard, an encoder (not shown) integrated into the conveying system 22 may generate pulses at fixed distance intervals corresponding to the forward movement of the conveyor belt 18 and/or any other belt of the system 22 and send output signals to the computer.

In order for accurate scanning (and therefore accurate portioning or trimming) to occur, it is necessary that the scanning system be very precise and calibrated appropriately. As noted above, in the scanning step, the laser line is visible to the camera in a way that any distortion to the line can be detected by the camera and interpreted by the software as product mass passing the laser line. The more level, flat, and undistorted the laser line can be, the more accurate the scan will be. In this regard, portioners have traditionally used a fabric belt beneath the scanning station that provides a flat surface most suitable for scanning. However, such fabric belts are not suitable for conveying the food product during the cutting/excising process using a waterjet cutter. Rather, for waterjet cutting, a robust metallic belt of a grid or "open" construction is needed to withstand the impact of the high-pressure waterjet as well as allow the waterjet to pass downwardly through the belt, for example, after cutting through the workpiece. As such, the workpiece can be transferred from the initial fabric belt associated with the scanner to a metallic grid-type belt for cutting.

During this transfer process, the workpiece may shift relative to the belt, as well as distort or change shape, due to various causes such as a difference in the speed of the belts, misalignment of the belts, difference in "grip" of the belts on the workpieces, etc. As a consequence, the location of the workpiece on the conveyor, and/or the configuration of the workpiece detected by the scanner, may not coincide with the workpiece that reaches the waterjet or other cutter being used. This can result in inaccuracies in the cutting and/or portioning of the workpiece.

Portioners may instead scan and cut on the same belt, eliminating the transfer point and the problems they can cause. The cutting step is unchanged, but there can be significant differences in scanning. As noted above, a belt used for cutting with a waterjet cutter must be an open metal belt to allow water to flow through. As such, the laser line falls on, and through, the open metal belt, complicating the calibration and scanning process.

Some solutions for calibrating the scanning station include using the transverse cross pins in the belts (see pins 194 in the belt 116 shown in FIG. 5) as a height reference line(s), and/or using software to continuously establish a reference height(s). For instance, referring to FIG. 2b, at block 28, a belt is scanned to identify a pin or a plurality of pins over a period of time. In one embodiment, the belt may be scanned for a first pin(s) by extending light from a light source across the moving conveyor belt to define a sharp shadow or light stripe line/laser, as described above. A video camera or the like may detect a first type of light stripe distortion caused by a first pin(s). If a first type of light stripe distortion from a first pin(s) is detected at decision block 30, appropriate output signal(s) are sent from the video camera to one or more computing devices, computers, etc., having at least one processor, as indicated by block 32. At block 34, the output signals are processed by non-transitory computer-readable medium (such as software) having computer-executable instructions stored thereon that, in response to execution by at least one processor of the one or more computing devices, cause the at least one computing device to perform actions that include determining a first height or z-axis location(s) of the identified first pin(s) along the length of the first pin(s) (i.e., a first height reference line), for instance, relative to a certain reference point along the z-axis. The "height" of the first pin(s) may vary along the length of the pin(s) if the pin(s) is not perfectly linear or straight, accordingly, the pin(s) may have a height or heights (hereinafter sometimes referred to as "pin(s) height(s)").

Figure 2B:
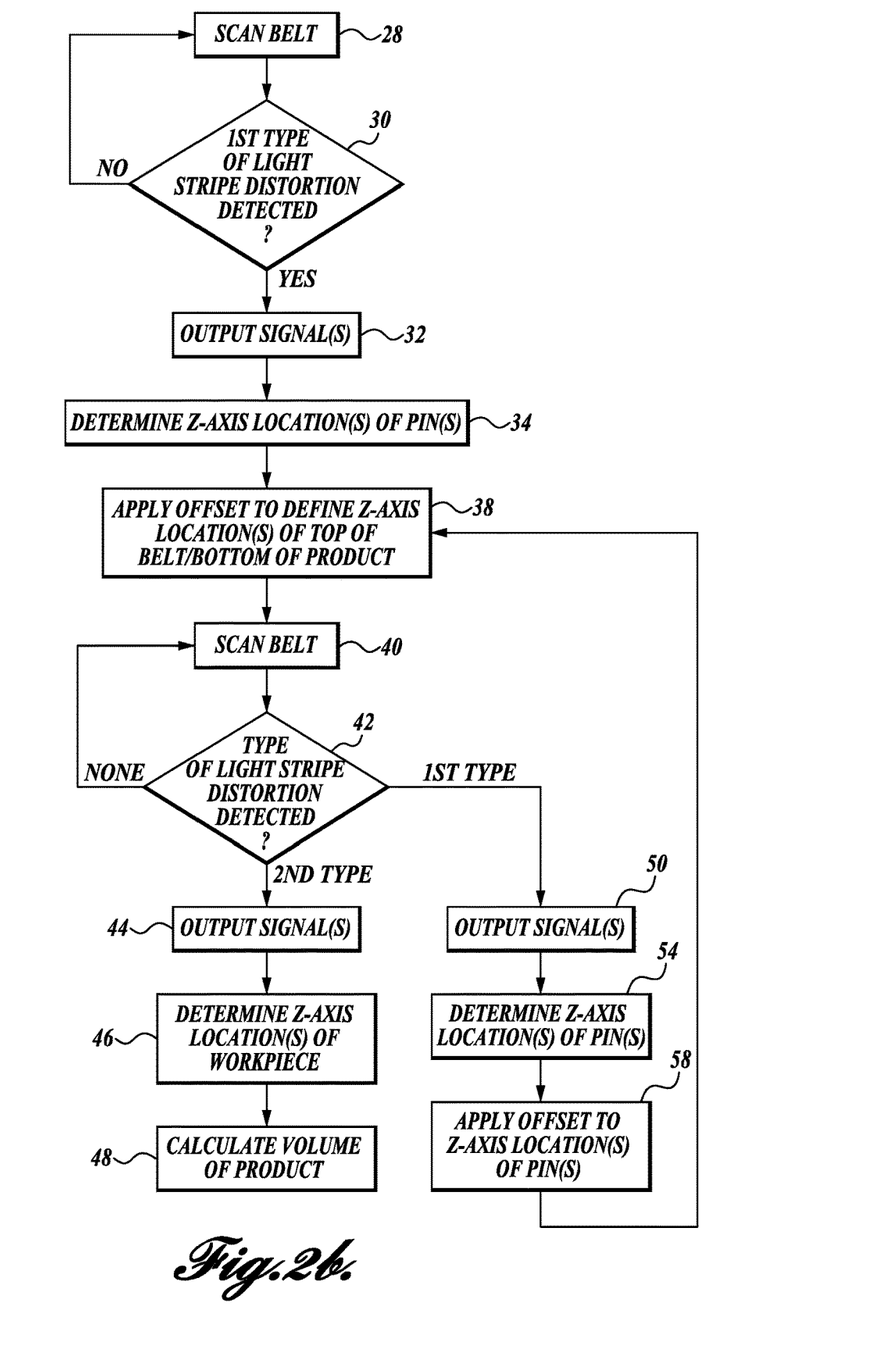
FIG. 2b is a flowchart depicting an exemplary scanning and calibration process formed in accordance with an aspect of the present disclosure.

When a first pin(s) is located and its height(s) determined, the computing device performs the action of applying a predetermined offset to the determined first pin height(s) to define the second height(s) or z-axis location(s) of the top of the belt and the bottom of the product, as indicated by block 38. The belt may then be scanned again, as indicated by block 40, to detect either the first type of light stripe distortion from a second pin(s) or a second type of light stripe distortion from a product on the belt. As indicated by decision block 42, if neither the first nor second light stripe distortion is detected, the belt continues to be scanned at block 40. If a second type of light stripe distortion from a product is detected (i.e., when the laser line passes over the product to show the top of the product), appropriate output signal(s) are sent from the video camera to the one or more computing devices, as indicated by block 44. The computing device performs the action of determining one or more third z-axis location(s) representative of the top surface of the product, as indicated by block 46, and it uses the height difference between the bottom of the product and the top of the product as the product passes the laser line on the moving conveyor belt to perform the action of calculating the volume of the product, as indicated by block 48.

If a first type of light stripe distortion from a second pin(s) is detected at decision block 42, appropriate output signal(s) are sent from the video camera to the one or more computing devices, as indicated by block 50. The computing device processes the output signals to determine a fourth height(s) or z-axis location(s) of the identified second pin(s) along the length of the pin(s), as indicated by block 54. At block 58, the computing device performs the action of applying an offset (based on the different in height between the first and second pins) to the initial or first z-axis location(s) or height(s) of the first scanned pin(s) that was determined at block 34 to recalculate the second height(s) or z-axis location(s) of the top of the belt and the bottom of the product, as indicated by block 38.

It should be noted that the portioning apparatus may also be calibrated, such as in the manner described in U.S. Provisional Patent Application No. 62/431,374, entitled "Methods for Calibrating Portioning Apparatus", the disclosure of which is incorporated by reference herein.

The offset added to the first pin(s) height(s) (or z-axis location(s)) during the scanning station calibration process does not account for irregularities in the top surface of the belt. For instance, with the belt also being used for cutting, the top surface of the belt will become quite worn over time from the waterjets. Wearing of the belt can distort the laser line at the top surface of the belt. Establishing the pin(s) in the belt as the reference height, and then adding an additional offset helps overcome some of the variability due to wear on the top of the belt. The pins within the belt are fairly stiff, however, without proper support, the pins can sag and bend over time. As the pins continue to sag and bend over time, more offset is needed during calibration, complicating the calibration process and compromising scanning accuracy.

A belt support positioned beneath the scanning portion of the conveyor belt may be used to help prevent the pins from sagging and bending over time. An ideal belt support must provide a completely level surface for the belt to ride over prior to, and after traveling past the laser line. At the same time, the belt support should provide support in a manner that does not interfere with the travel of the belt while being sufficiently durable to withstand the wear of the passing belt. Moreover, the belt support should be configured such that it is not overly reflective so as to interfere with the scanning system and it should be easy to clean.

To meet at least some of these requirements, some prior art systems use substantially non-reflective flat plastic plates beneath the open metal belt in the scanning area. However, the plastic plates often distort over time, even with reinforcements built in, thereby affecting scanning accuracy. Moreover, the plastic plates are difficult to adjust and level to accommodate distortion of the plate and/or wear of the metal belt. Furthermore, the plastic plates are difficult to clean, making hygiene an issue.

Accordingly, an improved belt support configured to support a belt on which a workpiece may be both scanned and portioned is desired.

SUMMARY

A conveyor belt support system for a conveyor having a belt movable along a frame includes a plurality of support slats each extending substantially along a longitudinal axis of the belt. Each of the support slats is adjustable in position relative to the belt.

In another aspect, a processing machine for scanning and portioning a workpiece includes a scanning station configured to scan a workpiece to ascertain at least one physical parameter of the workpiece, a portioning station configured to portion the scanned workpiece, a conveyor for moving the workpiece beneath the scanning station and the portioning station that includes a belt with an open form moveable along a frame, and the conveyor belt support system located beneath at least the scanning station. The conveyor belt support system includes a plurality of support slats each extending substantially along a longitudinal axis of the belt, wherein each of the support slats are adjustable in position relative to the belt.

In another aspect, the processing machine further includes a scanning system having at least one video camera configured to view any distortion of a light stripe caused by a workpiece moving on the belt as the workpiece passes the light stripe. The processing machine may further include a calibration system configured for calibrating the height of the belt using a portion of the belt as a height reference line. The belt may include cross pins extending substantially transversely to the longitudinal axis of the belt that connect belt links, and at least one cross pin may be used as the height reference line.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "top," "bottom," "in," "out," "extended," "advanced," "retracted," "proximal," "distal," etc. These references and other similar references in the present application are only to assist in helping describe and understand the present disclosure and are not intended to limit the present invention to these directions.

The present application may include modifiers such as the words "generally," "approximately," "about", or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally rectangular in shape," the shape need not be exactly rectangular as long as the required function of the structure in question can be carried out.

Further, the system and method disclosed in the present application and defined in the present claims, though specifically applicable to workpieces or food items, may also be used outside of the food area. The workpiece WP may be a food product, such as meat, poultry, or fish, or another type of product, such as, for example, fabric, rubber, cardboard, plastic, wood or other types of material. Accordingly, the present application and claims reference "workpieces", which may include non-food items.

Figure 3:
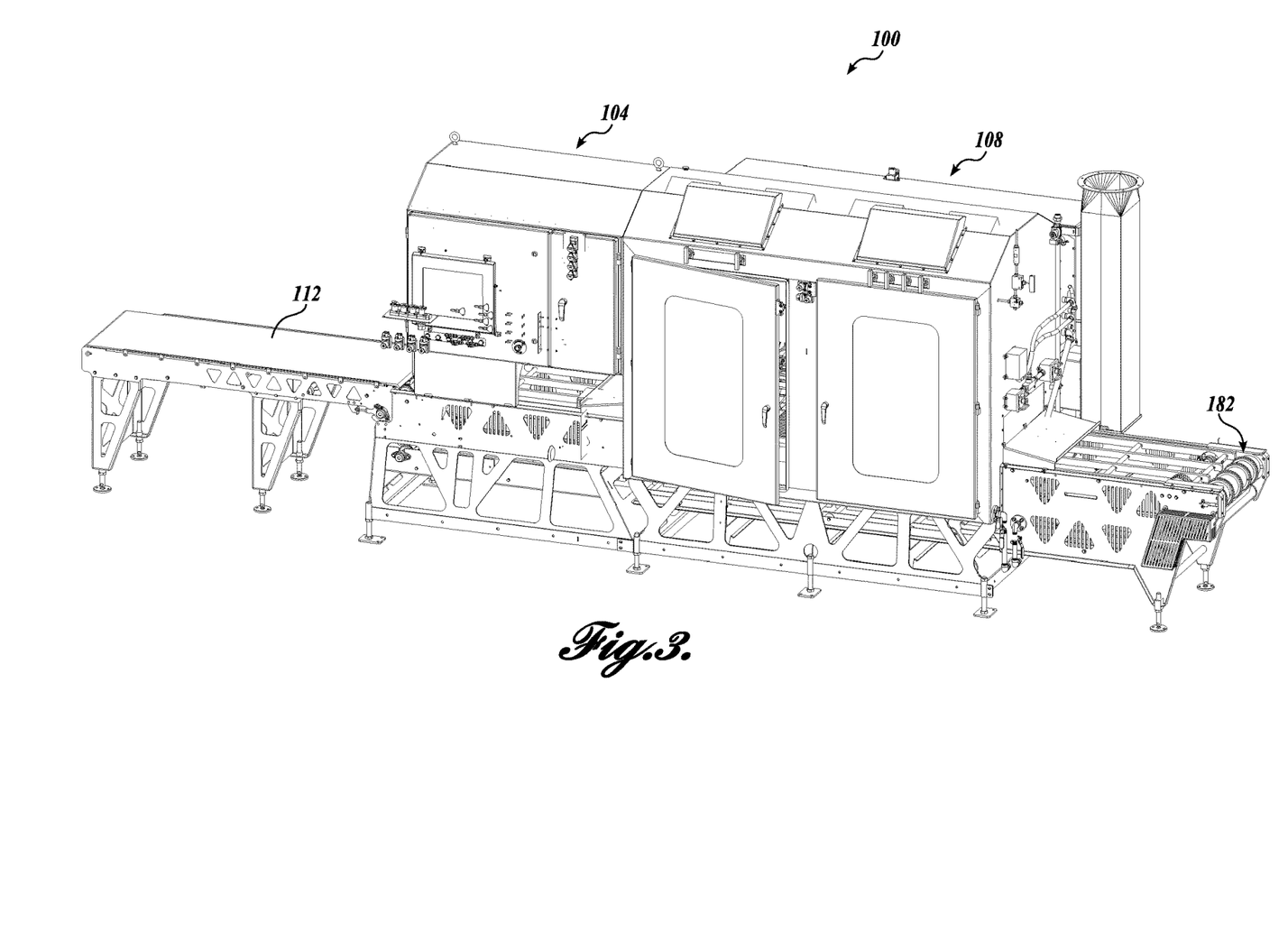
FIG. 3 is an isometric view of a processing machine utilizing a conveyor belt support system formed in accordance with the present disclosure, wherein the processing machine includes a scanning station and a portioning station.
Figure 4:
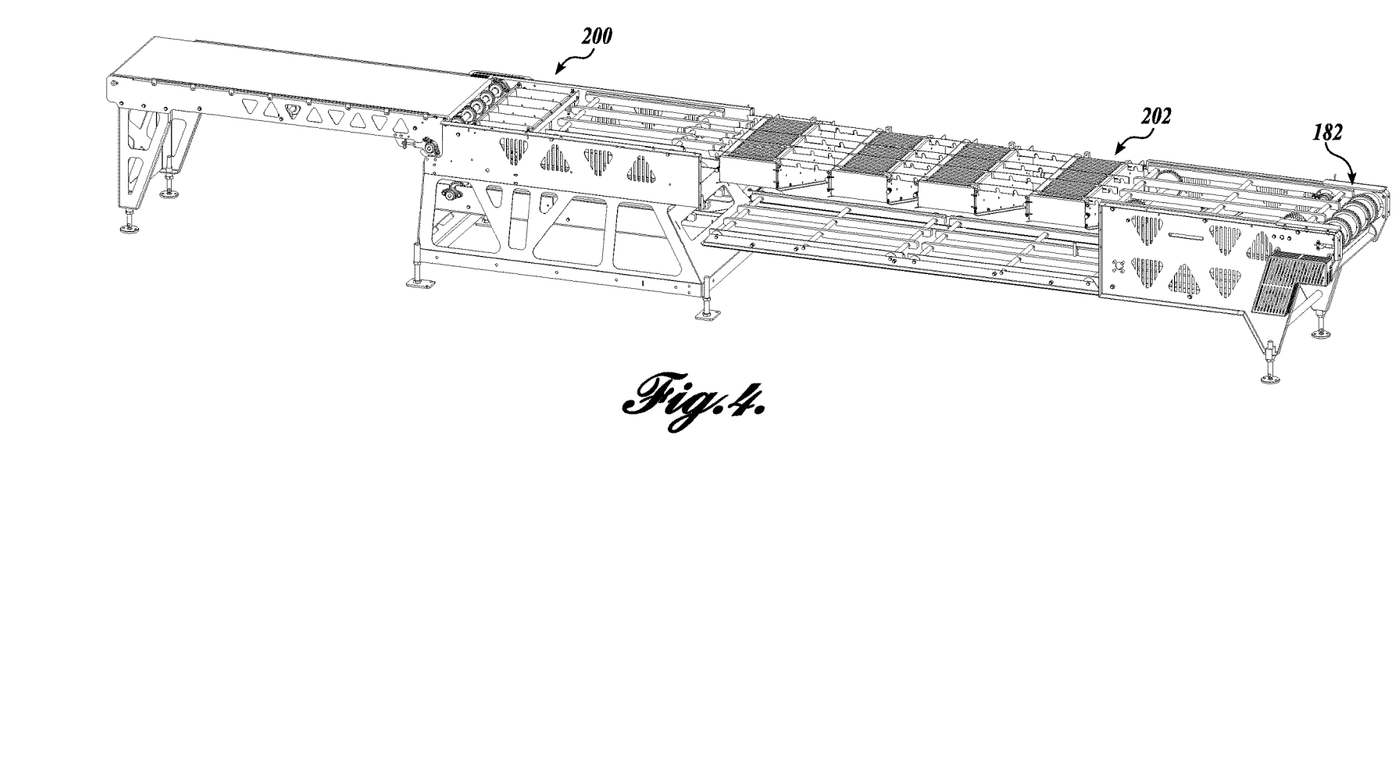
FIG. 4 is an isometric view of the processing system of FIG. 3, wherein a portion of the system has been removed to show the conveyor belt support system.

An exemplary embodiment of a processing machine 100 for scanning and portioning a workpiece WP is illustrated in FIGS. 3 and 4. The processing machine 100 generally includes a scanning station 104, a portioning station 108, a first or upstream conveyor 112 for carrying the workpiece WP to the scanning station 104, and a scanning/portioning conveyor 116 (not shown in FIGS. 3 and 4) for conveying the workpiece WP beneath the scanning and portioning stations 104 and 108. In that regard, the workpieces WP are transferred from the first conveyor 112 to the scanning/portioning conveyor 116 before passing beneath the scanning station 104. The processing machine 100 further includes a first conveyor belt support system 200 for supporting the moving scanning/portioning conveyor 116 beneath the scanning station 104 without substantially interfering with the scanning, and a second conveyor belt support system 202 for supporting the moving scanning/portioning conveyor 116 beneath the portioning station 108.

With respect to scanning, the workpieces WP are inspected at the scanning station 108 to ascertain physical parameters of the workpiece WP pertaining to size and/or shape of the workpieces, as generally described above with respect to FIGS. 1 and 2. Such parameters may include, for example, the length, width, aspect ratio, thickness, thickness profile, contour, outer contour configuration, perimeter, outer perimeter configuration, outer perimeter size and shape, and/or weight.

Figure 5:
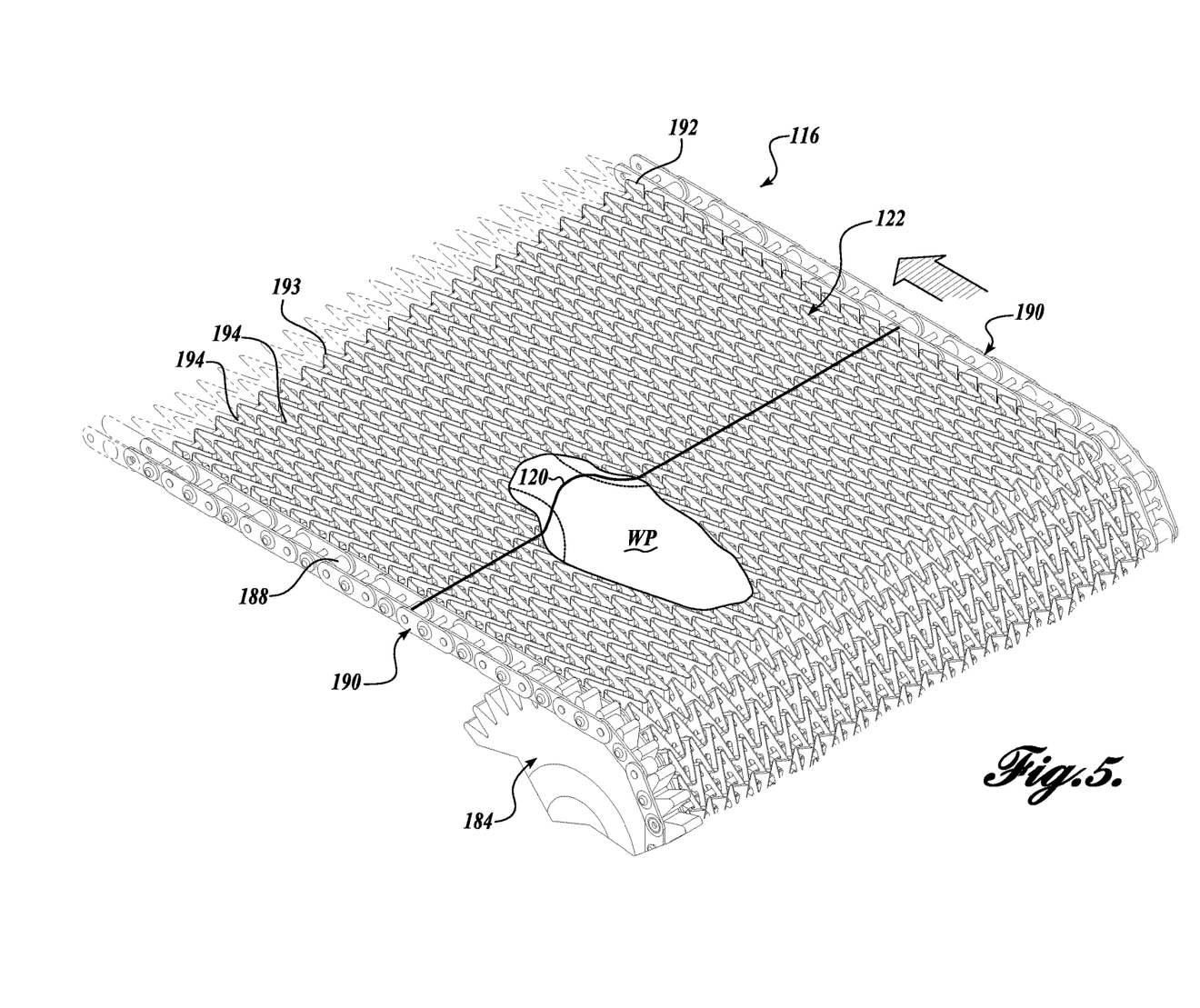
FIG. 5 is an isometric view of a light stripe or laser line applied to a workpiece conveyed on a conveyor belt used for scanning in the processing machine of FIG. 3.

Referring to FIG. 5, the scanning station 104 may include video cameras (not shown) to view the workpiece WP illuminated by one or more light sources that extend transversely across the moving scanning/portioning conveyor 116 to define a sharp shadow or light stripe line 120. When no workpiece WP is being carried by the scanning/portioning conveyor 116, the shadow line/light stripe 120 forms a line having no second type of distortion that extends across the scanning/portioning conveyor 116. However, when the workpiece WP passes across the shadow line/light stripe, the upper, irregular surface of the workpiece produces a second type of distortion, i.e., an irregular shadow line/light stripe as viewed by video cameras. The video cameras detect the displacement of the shadow line/light stripe 120 from the position it would occupy if no workpiece were present on the scanning/portioning conveyor 116 (i.e., the z-axis location(s) of the pin(s) with any offset). This displacement represents the thickness of the workpiece WP along the shadow line/light stripe. The length of the workpiece is determined by the distance of the belt travel that shadow line/light stripes are created by the workpiece. In this regard, an encoder (not shown) may be integrated into the system to generate pulses at fixed distance intervals corresponding to the forward movement of the conveyor belt 116.

In lieu of a video camera, the scanning station may instead utilize any other suitable scanning techniques, such as those shown and described in U.S. Patent Application No. 62/431, 374 and U.S. Pat. No. 5,585,605, the disclosures of which are herein incorporated by reference in their entirety.

The results of the scanning occurring at station 104 are transmitted to a computer (not shown). After the workpiece WP has been scanned at station 104, it is conveyed on the scanning/portioning conveyor 116 to the portioning station 108. Various types of cutting devices can be utilized at portioning station 108 to cut or portion the workpiece WP or otherwise remove bones and other undesirable material from the workpiece as desired (collectively referred to as "portion" or "portioning"). One type of cutter that may be used employs high-pressure waterjets as disclosed in U.S. Pat. Nos. 4,875,254, 5,365,186, and 5,868,056, and incorporated herein by reference in their entirety.

In that regard, and referring to FIG. 5, the scanning/portioning conveyor 116 includes a belt 122 of metallic construction configured in grid or open form so that the waterjet(s) at portioner station 108 is (are) free to pass downwardly through the belt to a collection tank or other receptacle, not shown, positioned beneath the conveyor 116. Various constructs of conveyor belts corresponding to belt 122 are described in U.S. Pat. No. 6,854,590, incorporated by reference in its entirety herein.

In the depicted embodiment, the belt 122 is trained around idler sprockets 184 at an infeed end as well as around drive sprockets 182 at the opposite outfeed end of the scanning/portioning conveyor 116 (see FIGS. 3 and 4). The belt 122 is composed of formed, flat wire links 192. The belt links 192 are connected by metal cross pins 194 that engage through aligned holes formed in the links 192. A chain 190 having links 188 may extend along each side margin of the open weave conveyor belt 122. The teeth of the outermost idler sprockets 185 may engage the links 188, and middle idler sprockets 186 may engage the pins 194 (the drive sprockets may engage the belt in the same or similar manner). Belt 122 can be formed without chains 190, in which case the outermost sprockets can be designed to engage the outermost portions of belt 122.

Of course, belt 122 can be of numerous other types of construction, with FIG. 5 merely being illustrative of possible constructions. As noted above, an encoder may be utilized in conjunction with the scanning/portioning conveyor 116 to generate signals or pulses at fixed intervals corresponding to the rotation of drive sprocket 182 or a drive shaft (not shown) coupled to the sprocket 182. This enables the locations of workpieces WP moving on the scanning/portioning conveyor 116 to be known.

As discussed above, an open metal belt may be calibrated for scanning using the pin(s) in the belts to establish a height reference line (and any subsequent height reference line(s) for applying an offset at block 58 in FIG. 2b). In the depicted embodiment, the metal cross pins 194 connecting belt links 192 may be used to establish a height reference line. The first conveyor belt support system 200 is configured to support the moving scanning/portioning conveyor 116 beneath the scanning station 104 to help maintain a substantially level height reference line (reducing the offset applied at block 58 in FIG. 2b), while being easy to clean, durable, and without substantially interfering with the scanning process.

Figure 6:
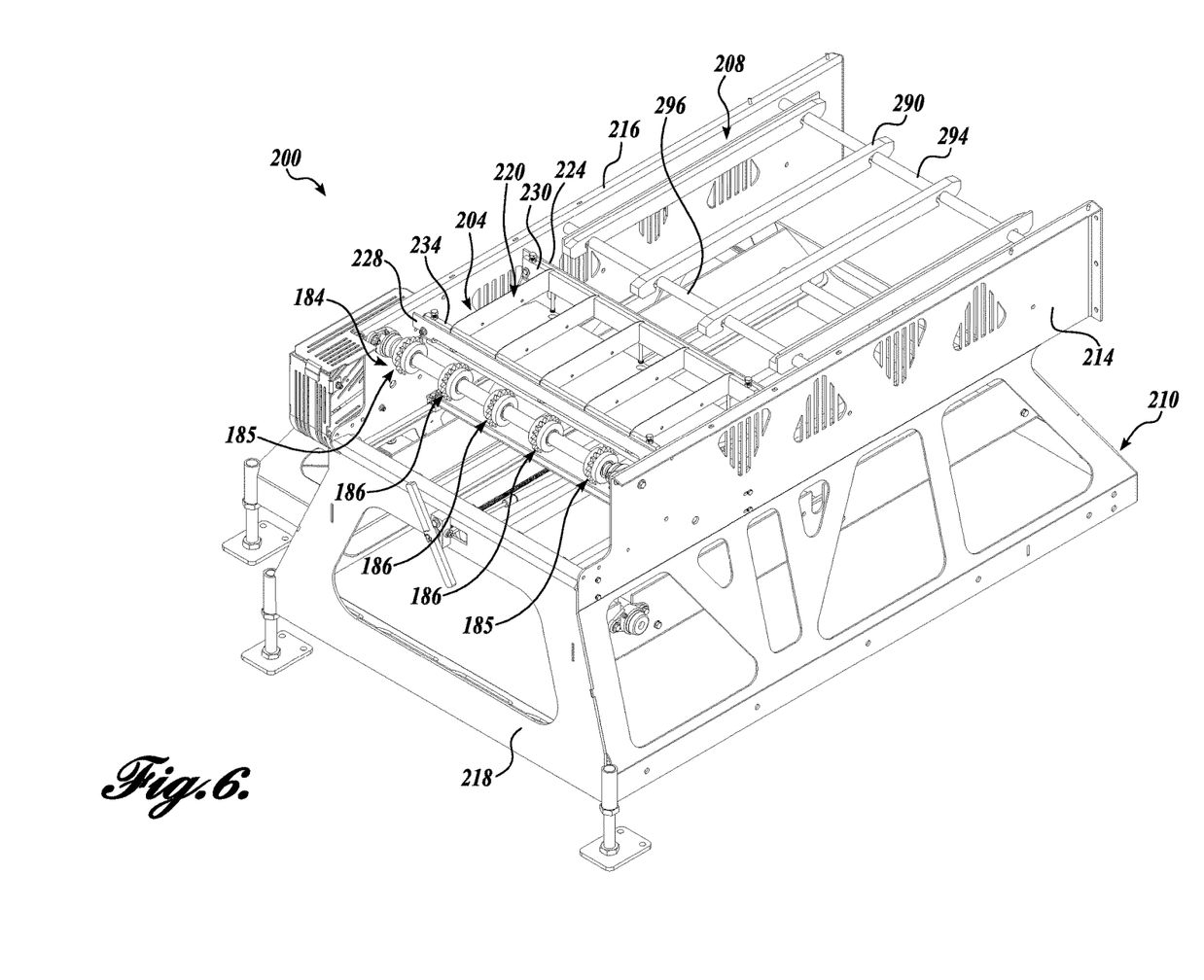
FIG. 6 is an isometric view of a conveyor belt support system formed in accordance with an exemplary embodiment of the present disclosure, wherein the conveyor belt is not shown for clarity.
Figure 7:
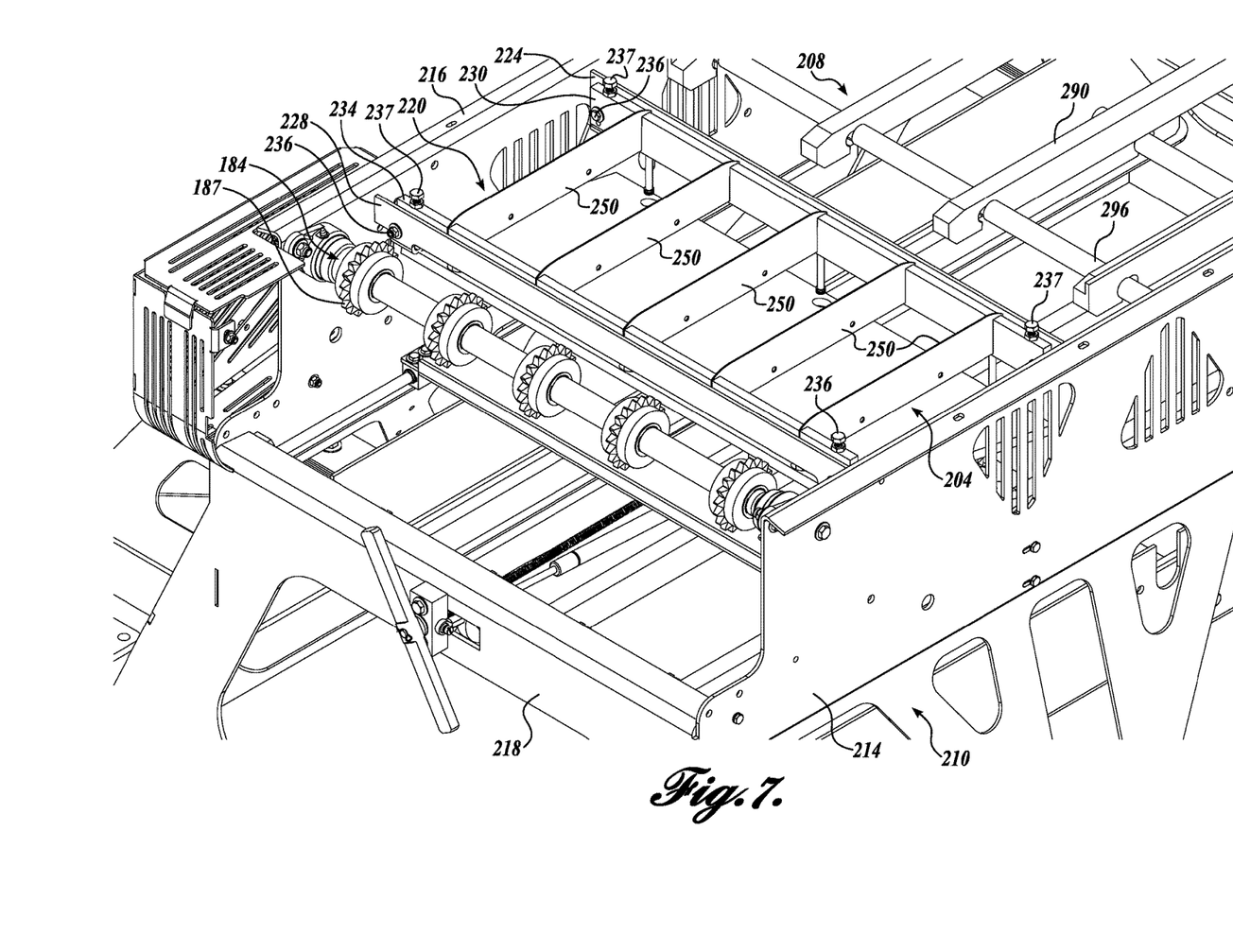
FIG. 7 is an enlarged isometric view of the conveyor belt support system of FIG. 6.
Figure 8:
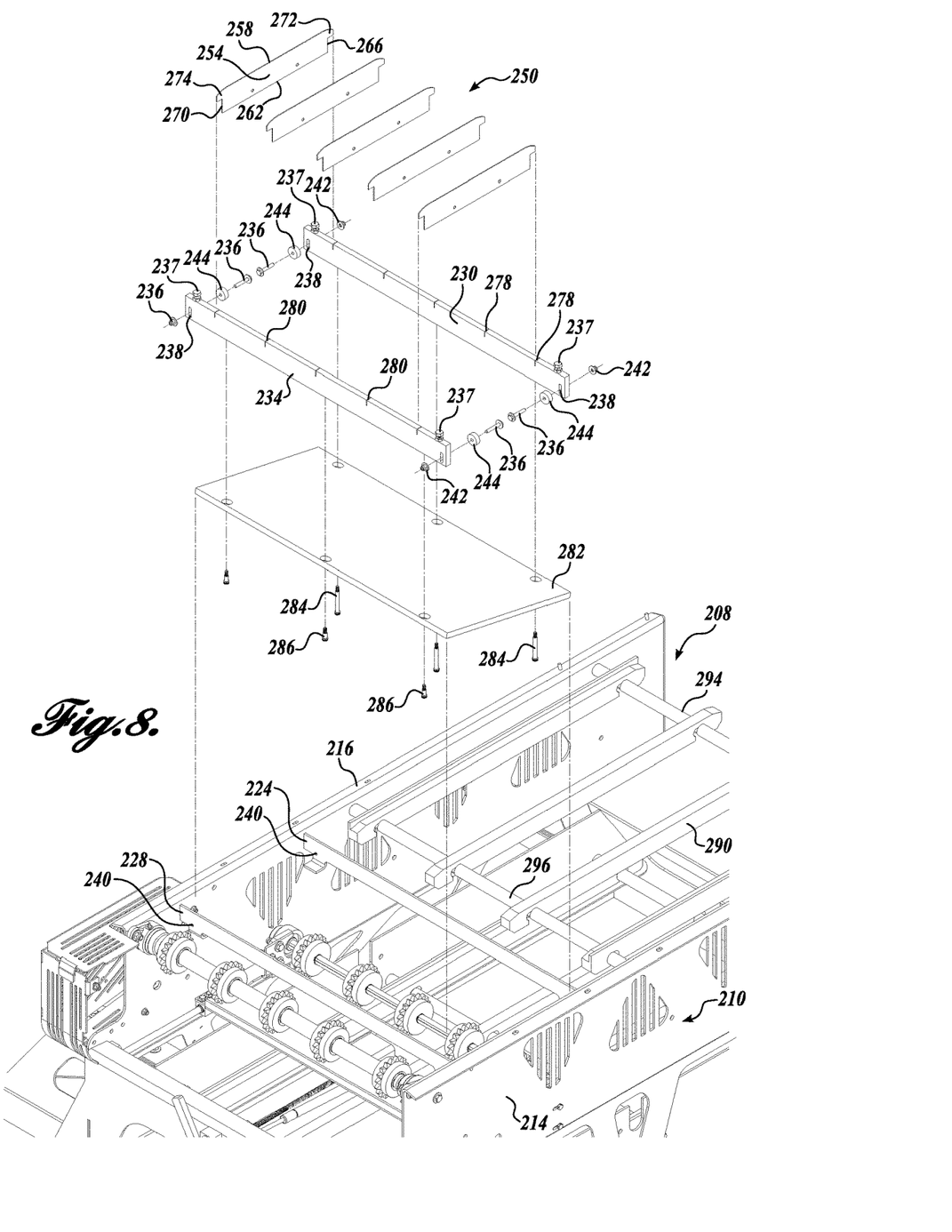
FIG. 8 is an exploded isometric view of the conveyor belt support system of FIG. 6.

Referring to FIGS. 6-8, the first conveyor belt support system 200 has a scanning support section 204 and a transport support section 208 located within a conveyor frame 210. The scanning support section 204 is configured to support the moving scanning/portioning conveyor 116 beneath the scanning station 104. Any suitable conveyor frame 210 may be used. In the depicted embodiment, the frame 210 includes first and second spaced apart substantially parallel side frame members 214 and 216 extending upwardly from a lower support member 218.

The scanning support section 204 of the first conveyor belt support system 200 is located at the infeed section of the moving scanning/portioning conveyor 116, although the scanning support section 204 may instead be located at any portion of the first conveyor belt support system 200 for appropriately supporting the scanning area. The scanning support section 204 is defined by an adjustable slider bed assembly 220 extending between the first and second side frame members 214 and 216 that is configured to support the moving scanning/portioning conveyor 116 as is moves past the scanning station 104.

Referring to FIGS. 7 and 8, the adjustable slider bed assembly 220 is secured within first and second cross-frame members 224 and 228 extending substantially transversely between the first and second side frame members 214 and 216. The first and second cross-frame members 224 and 228 are secured at their first and second ends to the first and second side frame members 214 and 216 in any suitable manner. The first and second cross-frame members 224 and 228 may be substantially L-shaped in cross section along at least a portion thereof for receiving first and second elongated guide bars 230 and 234 of the adjustable slider bed assembly 220 therein. The first and second guide bars 230 and 234 are preferably precision-machined and made from a suitably durable, strong material, such as stainless steel.

The first and second guide bars 230 and 234 extend substantially across the width of the frame 210 and are secured to the first and second cross-frame members 224 and 228 such that they are adjustable in position, such as height. The first and second guide bars 230 and 234 may be adjustably secured to the first and second cross-frame members 224 and 228 in any suitable manner, such as with one or more fasteners.

In the depicted embodiment, a jack bolt 237 extends substantially vertically into a corresponding threaded opening (not labeled) in each end of each guide bar 230, 234. The jack bolts 237 are used to raise and lower each corner of the adjustable slider bed assembly 220. More specifically, as each jack bolt 237 is threaded in a first direction, the corresponding end of the guide bar 230, 234 raises, and as each jack bolt 237 is threaded in a second direction, the corresponding end of the guide bar 230, 234 lowers. Of note, the open metal belt 122 runs between the jack bolts 237 without interference.

Additional fasteners or other structure may be used to help secure each corner of the adjustable slider bed assembly 220 in its vertical position. In the depicted embodiment, a setting bolt 236 passes through a vertical slot 238 in the guide bar 230, 234 and through an opening 240 in the corresponding cross-frame members 224, 228. The setting bolt 236 is secured in its vertical position within the vertical slot 238 of the guide bar 230, 234 with a nut 242 threaded onto the end of the setting bolt 236. A washer 244 may be received on the setting bolt 236 and positioned between the head of the setting bolt 236 and the guide bar 230, 234. The setting bolt 236 helps to secure the guide bar 230, 234 in its vertical position relative to the corresponding cross-frame members 224, 228.

A jack bolt/setting bolt assembly may be used at each end of each guide bar 230, 234 to adjustably secure the end of the guide bar 230, 234 to the corresponding cross-frame member 224, 228. In that regard, the vertical height or position of each guide bar 230, 234 may be adjusted at two points, i.e., at the first and second ends of each guide bar 230, 234. As such, and as will become further appreciated below, the adjustable slider bed assembly 220 is adjustable in height at four points relative to the frame 210 to adjust its overall vertical height relative to the frame 210 and/or the angle at which it is offset from horizontal.

In an alternative embodiment, however, the jack bolt/setting bolt assembly may be used at only one end of each guide bar 230, 234 to adjustably secure that end of the guide bar 230, 234 to the corresponding cross-frame member 224, 228, with the other end of the guide bar 230, 234 being pivotally fixed to the cross-frame member 224, 228. In such an alternative embodiment, the vertical height or position of each guide bar 230, 234 may be adjusted at only one point with the other end being fixed relative to the cross-frame member 224, 228.

The adjustable slider bed assembly 220 further includes a plurality of support slats 250 extending substantially transversely between and secured at their ends within the first and second guide bars 230 and 234. The support slats 250 are configured to support the scanning/portioning conveyor 116 beneath the scanning station 104. More specifically, the support slats 250 define a sliding plane for the open weave conveyor belt 122 as it moves past the scanning station 104. At the same time, the support slats 250 do not substantially interfere with scanning (e.g., they do not reflect a substantial amount of light).

In that regard, each support slat 250 in the exemplary embodiment is defined by a substantially rectangular, thin body 254 having an upper sliding edge 258, an opposite lower edge 262, a first side edge 266, and a second opposite side edge 270. The support slat 250 extends between the first and second guide bars 230 and 234 with the upper sliding edge 258 positioned to engage the bottom surface of the open metal belt 122 along the length of the scanning station 104. The body 254 is made from a suitable material and has a suitable thickness, height, and length to support the load of the moving belt 122 while not interfering with scanning. In that regard, the body 254 has a minimal thickness for avoiding any interference with or reflection of light from the scanning station 104 combined with a suitable length (between the first and second side edges 266 and 270) and height (between the upper and lower edges 258 and 262) to suitably support the load of the open weave conveyor belt 122 as it slides along the length of the scanning station 104. In one example, the body 254 may have a thickness in the range of 5/1000 to 25/1000 inches, a height in the range of 3/4 to 5 inches, and a length in the range of 3 to 16 inches to support an open metal belt about 12 to 36 inches wide.

The body 254 is also made from a material that is durable, easy to clean, and sufficiently strong to support the moving belt 122 and help prevent any sagging of the cross pins 194. Furthermore, if the scanning support section 204 is used for food products, the material is preferably suitable for food processing. Any suitable metal may be used, such as 304 or 316 stainless steel.

The plurality of support slats 250 are arranged between the first and second guide bars 230 and 234 such that the upper slide edges 258 define the sliding plane for the conveyor belt 122 as it moves past the scanning station 104. In that regard, the upper slide edges 258 of each of the plurality of support slats 250 may be substantially coplanar to define a substantially flat, level sliding plane for the conveyor belt 122. On the other hand, each support slat 250 may instead be configured to define the upper slide edges 258 at a different vertical position to account for any wear in the top surface of the belt from the waterjets or any misalignment of the belt cross pins 194.

In that regard, the plurality of support slats 250 are adjustable in height with the first and second guide bars 230 and 234 to vertically position the upper slide edges 258 in a desired plane. The plurality of support slats 250 may each be secured within the first and second guide bars 230 and 234 in any suitable manner. In the depicted embodiment, each support slat 250 includes a first tab 272 defined at a first upper corner (i.e., at the intersection of the upper sliding edge 258 and the first side edge 266) and a second tab 272 defined at a second upper corner (i.e., at the intersection of the upper sliding edge 258 and the second side edge 270).

Each tab 272 and 274 extends laterally from the first side edge 266 and the second side edge 270, respectively, and has an upper tab surface (not labeled) that is substantially co-planar with the upper sliding edge 258 so as not to interfere with the sliding movement of the belt 122. The first tab 272 of each support slat 250 is receivable within a first guide bar slot 278 defined in an upper edge of the first guide bar 230, and the second tab 272 of each support slat 250 is receivable within a second guide bar slot 280 of the second guide bar 234. The first and second tabs 272 and 274 are secured within the first and second guide bar slots 278 and 280 to secure each support slat 250 between the first and second guide bars 230 and 234. The first and second tabs 272 and 274 may be removably secured within the first and second guide bar slots 278 and 280 such that the support slat 250 may be removed as needed for cleaning, replacement, etc.

With the support slats 250 extending between and secured to the first and second guide bars 230 and 234, the position of the support slats 250 is adjustable with the first and second guide bars 230 and 234. In this manner, the adjustable slider bed assembly 220 (defined by the upper slide edges 258 of the support slats 250) may be adjusted as needed to appropriately support and provide a consistent, level sliding plane for the belt cross pins 194 of the open metal belt 122. In one embodiment, the support slats 250 are suitably adjustable such that the sliding plane has a flatness within a range of 0.2 to 1 mm per meter. The flatness range will depend on the accuracy of the scanning system, which could include considerations such as resolution and software.

The adjustable slider bed assembly 220 may be adjusted vertically and in its angle offset from horizontal by adjusting any one of the four jack bolts 234 and/or setting bolts 236 as described above. For instance, if the scanning/portioning conveyor 116 is divided into multiple side-by-side lanes that extend along the length of the conveyor, the belt 122 or supporting cross pins 194 extending across one or more of the lanes may become more worn over time than other lanes. Accordingly, if the belt 122 or cross pins 194 becomes worn or sags in a lane near the first side frame member 214, it may be helpful to raise only the first ends of the guide bars 230 and 234.

It should be appreciated that the adjustable slider bed assembly 220, and specifically, the support slats 250, may instead be adjusted in any other suitable manner. For instance, each support slat 250 may be individually and adjustably secured within the guide bars 230 and 234 such that the vertical position of each support slat 250 may be adjusted. Accordingly, the foregoing description and illustrations provided herein should not be seen as limiting.

The scanning support section 204 of the first conveyor belt support system 200, and specifically, the adjustable slider bed assembly 220 helps prevent the belt cross pins of the moving conveyor belt from sagging and bending over time. Moreover, if any portion of the moving belt sags or becomes worn (due to the waterjets or otherwise), the support slats 250 may be raised, lowered, and/or replaced as needed to help provide a completely level surface for the belt to ride over prior to, and after traveling past the laser line. The support slats 250, being made from a durable material such as stainless steel, are also suitable to withstand the wear of the passing belt and are easy to keep clean. Finally, with the support slats 250 providing only a thin sliding edge 258 over which the belt travels, the support slats 250 support the belt in manner that does not interfere with the travel of the belt and are not overly reflective so as to significantly interfere with the scanning system.

To minimize interference or reflection from other features of the frame 210, a non-reflective covering or sheet 282 that is substantially the same size and shape as the scanning area may be positioned beneath the adjustable slider bed assembly 220. The non-reflective sheet 282 may be secured to the first and second guide bars 230 and 234 or any other portion of the frame 210. In the depicted embodiment, the non-reflective sheet 282 is removably secured to the first and second guide bars 230 and 234 with a plurality of fasteners. For instance, a first set of fasteners 284 may be used to secure a first side of the non-reflective sheet 282 to the first guide bar 230, and a second set of fasteners 284 may be used to secure a second side of the non-reflective sheet 282 to the second guide bar 234. The fasteners may be of different lengths to position the non-reflective sheet 282 at an angle relative to the open metal belt 122, and/or the fasteners may be adjustable to suitably adjust the position of the non-reflective sheet 282.

As noted above, the first conveyor belt support system 200 also includes a transport support section 208 located within the conveyor frame 210. The transport support section 208 is configured to support the moving scanning/portioning conveyor 116 between the scanning station 104 and the portioning station 108. As no scanning is occurring along this length of the machine, the transport support section 208 need not be as precise, adjustable, and durable as the scanner support section 204. In that regard, the exemplary embodiment includes a transport support section 208 having a plurality of plastic slats 290 extending along the length of the section and secured between first and second rods 294 and 296. The first and second rods 294 and 296 are secured to the first and second side frame members 214 and 216 of the frame 210. It should be appreciated that any other suitable transport support section 208 may instead be used.

The transport support section 208 is positioned between the scanning support section 204 and a portioner support section (not shown) defined within the second conveyor belt support system 202. It should be appreciated in alternative embodiments, the first conveyor belt support system 200 may instead extend along the length of the transport support section 208 and/or the portioner support section. If the first conveyor belt support system 200 extended along the length of the portioner support section, it could instead be made from a more durable material to withstand the pressure of the waterjets, such as a carbide tungsten material such as Stellite™.

While illustrative embodiments have been illustrated and described, it will be appreciated that various changes can be made therein without departing from the spirit and scope of the invention.

The embodiments of the invention in which an exclusive property or privilege is claimed are defined as follows:

1. A conveyor belt support system for a conveyor having a belt movable along a frame, the conveyor belt support system comprising a plurality of support slats extending substantially along a longitudinal axis of the belt and each defining a support surface against which the belt moves, and wherein each of the plurality of support slats is moveable in at least a first direction to correspondingly move the belt in the first direction and in a second direction to correspondingly move the belt in the second direction to provide a substantially level sliding plane for the belt.

2. The conveyor belt support system of claim 1, wherein each of the plurality of support slats is individually adjustable in position relative to the belt.

3. The conveyor belt support system of claim 1, further comprising first and second guide bars adjustably securable within the frame and extending substantially transversely to the longitudinal axis of the belt, the plurality of support slats extending between the first and second guide bars.

4. The conveyor belt support system of claim 3, wherein the first and second guide bars each have first and second ends that are adjustably securable within the frame in at least a vertical position relative to the frame.

5. The conveyor belt support system of claim 4, wherein each of the first and second ends of the first and second guide bars includes a slot that is configured to adjustably receive a fastener for adjustably securing the first and second ends of the first and second guide bars to the frame.

6. The conveyor belt support system of claim 3, wherein each of the plurality of support slats has a first end secured to first guide bar and a second end secured to the second guide bar.

7. The conveyor belt support system of claim 1, wherein the support surface of each of the plurality of support slats is in a support surface plane, wherein a portion of the belt above each support surface is in a belt plane, and wherein each support surface plane and the corresponding belt plane remains substantially parallel when moved in the first and second directions.

8. The conveyor belt support system of claim 1, wherein each of the plurality of support slats has a height to thickness ratio of less than about 100:1.

9. The conveyor belt support system of claim 1, wherein the belt is a metallic, open form.

10. The conveyor belt support system of claim 9, wherein the belt includes a plurality of cross pins extending substantially transversely to the longitudinal axis of the belt that connect belt links, and wherein each of the plurality of support slats is moveable in at least a first direction to correspondingly move the plurality of cross pins in the first direction and in a second direction to correspondingly move the plurality of cross pins in the second direction.

11. A processing machine for scanning and portioning a workpiece, comprising:
   a scanning station configured to scan a workpiece to ascertain at least one physical parameter of the workpiece;
   a portioning station configured to portion the scanned workpiece;

a conveyor for moving the workpiece beneath the scanning station and the portioning station, the conveyor having a belt with an open form moveable along a frame; and a conveyor belt support system located beneath at least the scanning station, the conveyor belt support system having a plurality of support slats extending substantially along a longitudinal axis of the belt wherein the plurality of support slats are adjustable in position relative to the belt;

a calibration system configured for calibrating the height of the belt using a portion of the belt as a first height reference line;

at least one video camera configured to view a light stripe extending across the belt, wherein when the portion of the belt passes across the light stripe, a first type of light stripe distortion is viewable by the at least one video camera indicative of the first height reference line; and a non-transitory computer-readable medium having computer-executable instructions stored thereon that, in response to execution by at least one processor of at least one computing device, cause the at least one computing device to perform actions comprising determining one or more first z-axis locations representative of the first height reference line based on one or more output signals received from the at least one video camera.

12. The processing machine of claim 11, further comprising a non-transitory computer-readable medium having computer-executable instructions stored thereon that, in response to execution by at least one processor of at least one computing device, cause the at least one computing device to perform actions comprising calculating one or more second z-axis locations representative of a top of the belt and bottom of the workpiece by applying a predetermined offset to the one or more first z-axis locations.

13. The processing machine of claim 12, wherein when the workpiece is being carried by the belt and passes across the light stripe, an upper, irregular surface of the workpiece produces a second type of light stripe distortion that is viewable by the at least one video cameras indicative of a top surface of the workpiece.

14. The processing machine of claim 11, further comprising a non-transitory computer-readable medium having computer-executable instructions stored thereon that, in response to execution by at least one processor of at least one computing device, cause the at least one computing device to perform actions comprising calculating the thickness of the workpiece based on the difference in height between the second and third z-axis locations.

15. The processing machine of claim 11, wherein the belt includes a plurality of cross pins extending substantially transversely to the longitudinal axis of the belt that connect belt links, and wherein at least a first cross pin is the portion of the belt used as the first height reference line.

16. The processing machine of claim 15, wherein when at least a second cross pin passes across the light stripe, a first distortion type of the light stripe is viewable by the at least one video camera indicative of a second height reference line.

17. The processing machine of claim 16, further comprising a non-transitory computer-readable medium having computer-executable instructions stored thereon that, in response to execution by at least one processor of at least one computing device, cause the at least one computing device to perform actions comprising determining one or more fourth z-axis locations representative of the second height reference line based on one or more output signals received from the at least one video camera.

18. The processing machine of claim 11, wherein the belt is of metallic construction, and wherein the portioning station includes at least one waterjet cutter.

19. The processing machine of claim 11, wherein each of the plurality of support slats has a height to thickness ratio of less than about 100:1.

20. A conveyor belt support system for a conveyor having a belt movable along a frame, the conveyor belt support system comprising:

a plurality of support slats extending substantially along a longitudinal axis of the belt, wherein the plurality of support slats are adjustable in position relative to the belt; and first and second guide bars adjustably securable within the frame and extending substantially transversely to the longitudinal axis of the belt, the plurality of support slats extending between the first and second guide bars, wherein each of the plurality of support slats has a first end secured to first guide bar and a second end secured to the second guide bar.

* * * * *